United States Patent
Johnson et al.

(10) Patent No.: US 9,702,494 B2
(45) Date of Patent: Jul. 11, 2017

(54) DUCT ASSEMBLIES WITH INTERNALLY BOLTED EXPANSION JOINT

(71) Applicant: FLUOR TECHNOLOGIES CORPORATION, Aliso Viejo, CA (US)

(72) Inventors: Dennis W. Johnson, Simpsonville, SC (US); James Hurley Brown, Simpsonville, SC (US); Fred C. Smith, Marietta, OH (US); Kim Moody Jackson, Marietta, SC (US); Bradley D. Smoak, Greenville, SC (US)

(73) Assignee: Fluor Technologies Corporation, Sugar Land, TX (US)

( * ) Notice: Subject to any disclaimer, the term of this patent is extended or adjusted under 35 U.S.C. 154(b) by 957 days.

(21) Appl. No.: 13/898,343

(22) Filed: May 20, 2013

(65) Prior Publication Data
US 2014/0339815 A1 Nov. 20, 2014

(51) Int. Cl.
*F16L 51/00* (2006.01)
*F16L 51/02* (2006.01)

(52) U.S. Cl.
CPC .............. *F16L 51/00* (2013.01); *F16L 51/021* (2013.01); *F16L 51/025* (2013.01)

(58) Field of Classification Search
CPC .......... F16L 39/04; F16L 51/02; F16L 51/024
USPC ................................................. 285/226, 424
See application file for complete search history.

(56) References Cited

U.S. PATENT DOCUMENTS

| | | | |
|---|---|---|---|
| 1,263,953 A | | 4/1918 | Smyth |
| 3,460,856 A | * | 8/1969 | Van Tine .............. F16L 51/024 285/236 |
| 3,593,468 A | | 7/1971 | Bustin |
| 3,725,565 A | * | 4/1973 | Schmidt .................. H01B 12/00 285/226 |
| 3,730,566 A | * | 5/1973 | Kazmierski, Jr. ... F16L 27/1004 285/229 |
| 3,811,714 A | * | 5/1974 | Pintard .................. F16L 51/021 285/229 |
| 3,997,194 A | * | 12/1976 | Eifer ..................... F16L 51/025 285/226 |

(Continued)

FOREIGN PATENT DOCUMENTS

| | | | |
|---|---|---|---|
| DE | 1190749 | * 4/1965 | ............ F16L 51/024 |
| DE | 3819086 A1 | * 12/1989 | .............. F16L 39/04 |

(Continued)

OTHER PUBLICATIONS

International Application No. PCT/US2013/041899, International Search Report, dated Feb. 12, 2014, 3 pages.

(Continued)

*Primary Examiner* — David E Bochna
(74) *Attorney, Agent, or Firm* — Conley Rose, P.C.; Kristin Jordan Harkins

(57) ABSTRACT

A contiguous duct assembly has first and second ducts that share at least one common wall element. An expansion joint is formed at the end of the contiguous duct assembly using a connector element that extends with respective portions into the internal spaces of the first and second ducts. First and second expansion fabrics are coupled to the respective portions from the inside of the ducts using fasteners that are accessible from and disposed within the internal space of the first and second ducts.

13 Claims, 5 Drawing Sheets

(56) References Cited

U.S. PATENT DOCUMENTS

| | | | |
|---|---|---|---|
| 4,090,726 A | | 5/1978 | Mischel |
| 4,140,338 A | * | 2/1979 | Kazmierski, Jr. ..... F16L 51/021 285/229 |
| 4,159,133 A | * | 6/1979 | Belanger ............... F16L 51/024 285/226 |
| 4,215,882 A | * | 8/1980 | Bosch .................... F16L 27/111 285/227 |
| 4,265,473 A | * | 5/1981 | Russo ................... F16L 51/021 285/424 |
| 4,848,803 A | * | 7/1989 | Bachmann .............. F16L 59/21 285/229 |
| 5,443,290 A | | 8/1995 | Boyer et al. |
| 5,704,657 A | * | 1/1998 | Asanuma .............. E21D 11/385 285/226 |
| 6,027,147 A | * | 2/2000 | Elliott .................... F16L 51/024 285/229 |
| 6,402,203 B1 | | 6/2002 | Mathiesen et al. |
| 7,284,771 B2 | * | 10/2007 | Baumann ................ F01N 3/043 285/226 |
| 8,033,576 B2 | | 10/2011 | Argersinger |
| 2009/0194266 A1 | | 8/2009 | Conrad et al. |

FOREIGN PATENT DOCUMENTS

| | | | |
|---|---|---|---|
| EP | 0519636 A1 | 12/1992 | |
| EP | 0879986 A2 | 11/1998 | |
| FR | 2266095 | * 10/1975 | ............. F16L 51/02 |
| FR | 2274859 | 9/1976 | |
| FR | 2643699 A1 | 8/1990 | |
| FR | 2751048 A1 | 1/1998 | |
| WO | 2014189489 A1 | 11/2014 | |

OTHER PUBLICATIONS

International Application No. PCT/US2013/041899, Written Opinion of the International Searching Authority, dated Feb. 12, 2014, 8 pages.

International Application No. PCT/US2013/041899, International Preliminary Report on Patentability, dated Nov. 24, 2015, 9 pages.

Canada Patent Application No. 2,916,995, Office Action, dated Nov. 17, 2016, 3 pages.

Europe Patent Application No. 13885074.8, Extended European Search Report, dated Dec. 22, 2016, 5 pages.

* cited by examiner

DUCT ASSEMBLIES WITH INTERNALLY BOLTED EXPANSION JOINT

FIELD OF THE INVENTION

The field of the invention is expansion joints and especially expansion joints for duct assemblies.

BACKGROUND

The following description includes information that may be useful in understanding the present invention. It is not an admission that any of the information provided herein is prior art or relevant to the presently claimed invention, or that any publication specifically or implicitly referenced is prior art. Moreover, all publications and other external materials discussed herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Expansion joints for gas and liquid conduits are known for a relatively long time, and a typical expansion joint is illustrated in U.S. Pat. No. 1,263,953. Here, the expansion joint is installed via external flanges and uses a single layer of flexible materials to accommodate for differences in length due to thermal expansion. In a similar arrangement, U.S. Pat. No. 3,460,856 teaches an externally (with respect to the internal volume of the conduit) mounted expansion joint with a composite layer of flexible material for use with high-temperature gases. To control problems associated with dust, ash, or other solid particles, U.S. Pat. No. 4,090,726 employs a baffle arrangement in a typical externally mounted expansion joint with an expansion fabric, and U.S. Pat. No. 6,027,147 discloses an internal dust seal in combination with a typical know externally mounted expansion joint.

Alternatively, in yet other known examples of known expansion joints, external sliding expansion members may be used in place of expansion fabric as shown in FR 2,274,859, and in a similar manner, U.S. Pat. No. 3,730,566 discloses use of sliding plates and an external expansion fabric. Prior Art FIG. 1 shows a typical expansion joint for a single duct. While most of the currently known expansion joints are suitable for single and relatively small ducts, significant difficulties arise where the expansion joint is intended for use with contiguous ducts, and particularly with contiguous ducts with relatively large internal diameter (e.g., smallest dimension of at least 1 m). For example, large diameter ducts 200 are often separately constructed and also separately supported on respective suitable support structures 202 as is shown in Prior Art FIG. 2A. Here, significant quantities of steel are required for the support structure 202 as well as substantial quantities of duct materials. Additionally, each duct requires its own expansion joint where such joints are needed.

To reduce the significant material cost and construction work, ducts may be configured as contiguous duct assemblies as schematically illustrated in FIG. 2B. In such case, substantial material savings can be achieved by use of a common wall element 210 between two ducts, and by providing a single support structure for the contiguous duct assembly. However, currently known expansion ducts as described above are not suitable for installation as such joints accommodate only single ducts. Therefore, to include an expansion joint, a transition or split of the ducting must be implemented to separate the contiguous duct into separate ducts that can then be fitted with the expansion joint. However, such configurations typically complicate structural support design and construction, and add significant cost.

Therefore, while numerous expansion joints are known in the art, there is still a need for improved devices and methods of expansion joints, especially for contiguous duct assemblies.

SUMMARY OF THE INVENTION

The present invention is directed to devices and methods for expansion joins for use with contiguous duct assemblies that advantageously allow coupling of two duct assemblies via the expansion joint in a manner such that the first and second ducts of the respective duct assemblies need not be separated to accommodate the expansion joint. As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In one aspect of the inventive subject matter a contiguous duct assembly that includes a first and a second duct that are fluidly isolated from each other and coupled together such that both ducts share a common wall element along their longitudinal axes. Contemplated duct assemblies further include an expansion joint having first and second frame portions that are coupled to respective ends of the first and second ducts. A connector element is coupled to the common wall element and is configured to form part of the expansion joint, wherein one portion of the connector element extends into an inner volume of the first duct and wherein another portion of the connector element extends into an inner volume of the second duct. It is further preferred that a first and a second expansion fabrics are coupled to the one portion and the other portion of the connector element via a plurality of fasteners (e.g., bolt and nut fasteners), wherein the plurality of fasteners are disposed in the inner volumes of the first and second ducts, respectively.

It is generally preferred that the common wall element is thermally insulated when the duct is used for flue gases rather than air, and that the first and second ducts have a height or width that is at least two meters. While not limiting to the inventive subject matter, it is generally preferred that at least a portion of the first and/or the second frame portions form the connector element. In other aspects, it is preferred that the first and the second frame portion and the connector portion are removably coupled to the first and second ducts. Where suitable, the first and/or second expansion fabrics may be replaced by one or more slide plates. Additionally, it is contemplated that a dust shield may be coupled to the expansion joint for the first or second duct.

Therefore, and viewed from a different perspective, an internally bolted expansion joint for a contiguous duct assembly as noted above will include a connector element that is coupled to the common wall element and configured to form part of the expansion joint, wherein one portion of the connector element extends into an inner volume of the first duct and wherein another portion of the connector element extends into an inner volume of the second duct. A first and a second expansion fabric are preferably coupled to the two portions of the connector element via a plurality of fasteners, wherein the fasteners are disposed as least in part in the inner volumes of the first and second ducts, respectively.

While not limiting to the inventive subject matter, it is preferred that the connector element is welded to the common wall element, or that the connector element is removably coupled to the common wall element via a secondary connector element and a secondary fastener, wherein the secondary fastener is removable from and disposed within the inner volume of the first or second duct. As noted before, it is typically preferred that the first and second ducts and the common wall element are thermally insulated, and/or that a dust shield is coupled to the common wall element, the connector element, the first duct, or the second duct. In still further contemplated aspects, the contiguous duct assembly is coupled to a further continuous duct assembly having a third duct and a fourth duct via the expansion fabric.

Therefore, the inventors also contemplate a method of forming a contiguous duct assembly in which in one step a first duct is provided that lacks a permanent wall element along its longitudinal axis, wherein the first duct further includes a first alignment flange. In another step, a second duct is provided that has a permanent wall element along its longitudinal axis, wherein the second duct further includes a second alignment flange. In a still further step of contemplated methods, the first and second ducts are positioned such that the permanent wall element of the second duct forms a common wall element for the first and second ducts along the longitudinal axis of the first and second ducts, and a connector element is coupled to the common wall element and forms part of an expansion joint, wherein one portion of the connector element extends into an inner volume of the first duct and wherein another portion of the connector element extends into an inner volume of the second duct. In yet another step, a first and a second expansion fabric (or slide plate) are coupled from within the first and second ducts to the one portion and the other portion of the connector element via a plurality of fasteners, respectively, and in still another step, the first and second alignment flanges are coupled from the outside of the first and second ducts to so form the contiguous duct assembly.

Most typically, the first duct has a supplemental stiffener in place of the permanent wall, and/or the first and second duct and the common wall element are thermally insulated. Where desired, a dust shield is coupled to the first and/or second ducts, and/or the connector element. It is also further preferred that the first and second alignment flanges are removably coupled to each other, and/or that a further contiguous duct assembly is coupled to the contiguous duct assembly via the first and second expansion fabrics.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

Prior Art

Prior Art

DETAILED DESCRIPTION

The inventors have discovered that significant material and labor reduction is possible for duct work with expansion joints, and particularly for large-scale ducts with expansion joints by configuring the duct work as contiguous duct assembly in which an expansion joint is formed at the end of the contiguous duct assembly using a connector element that projects into the interior of the ducts to serve as an anchor point for the expansion fabric. Most preferably, as the devices and methods contemplated herein are especially suitable for large-scale ducts, all (or almost all) of the fasteners used to install the expansion joint are disposed within the interior of the ducts. Thus, it should be appreciated that the internal bolted expansion joint will solve the problem of expensive transitions to use conventional externally bolted expansion joints.

Consequently, it should be recognized that numerous advantages can be achieved for large-scale duct assemblies according to the inventive subject matter, including reduction in structural steel required for support, reduction in steel and other duct materials (and insulation), reduction in construction costs, and reduction in overall height which advantageously reduces seismic and wind loads. In addition, it should be appreciated that the contiguous duct assemblies with expansion joint presented herein allow the expansion joints to be made without tailored transitions and/or splitting of the ducts. Moreover, as all installation and maintenance work for the expansion joint can be performed from the inside of the ducts, potential safety hazards (e.g., falling hazard) are effectively reduced. Lastly, due to the modular nature, contiguous duct assemblies can be trucked and assembled in situ, which significantly improves among other things construction sequencing by eliminating the intermediate support.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed. Moreover, as used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Figure 1:
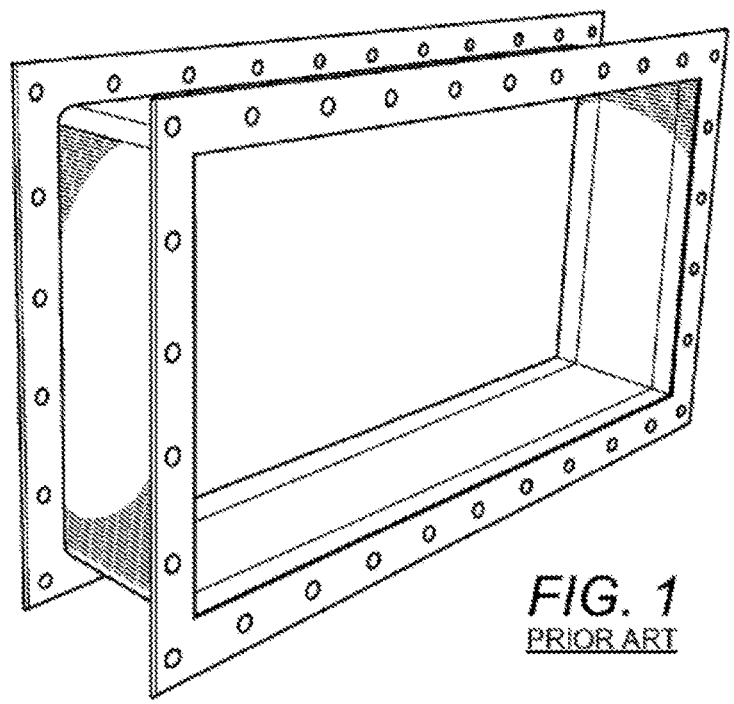
FIG. 1 is a photograph of an exemplary known expansion joint.
Figure 2A:
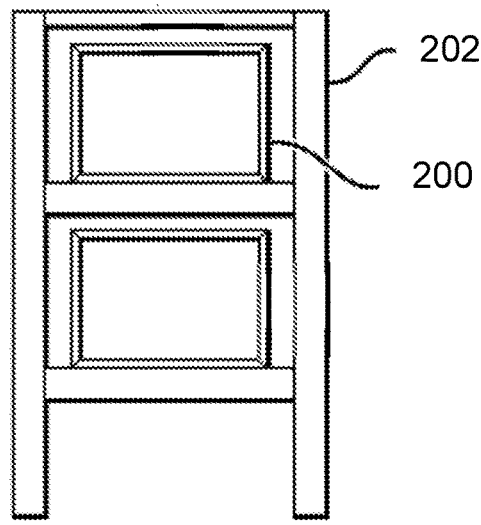
FIG. 2A is an exemplary schematic for a known configuration for flue gas ducts.
Figure 2B:
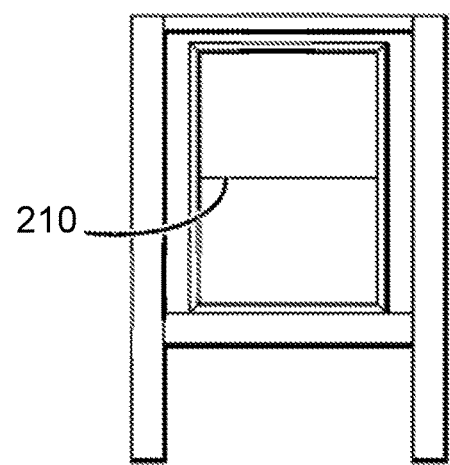
FIG. 2B is an exemplary schematic for a contiguous duct assembly.
Figure 3A:
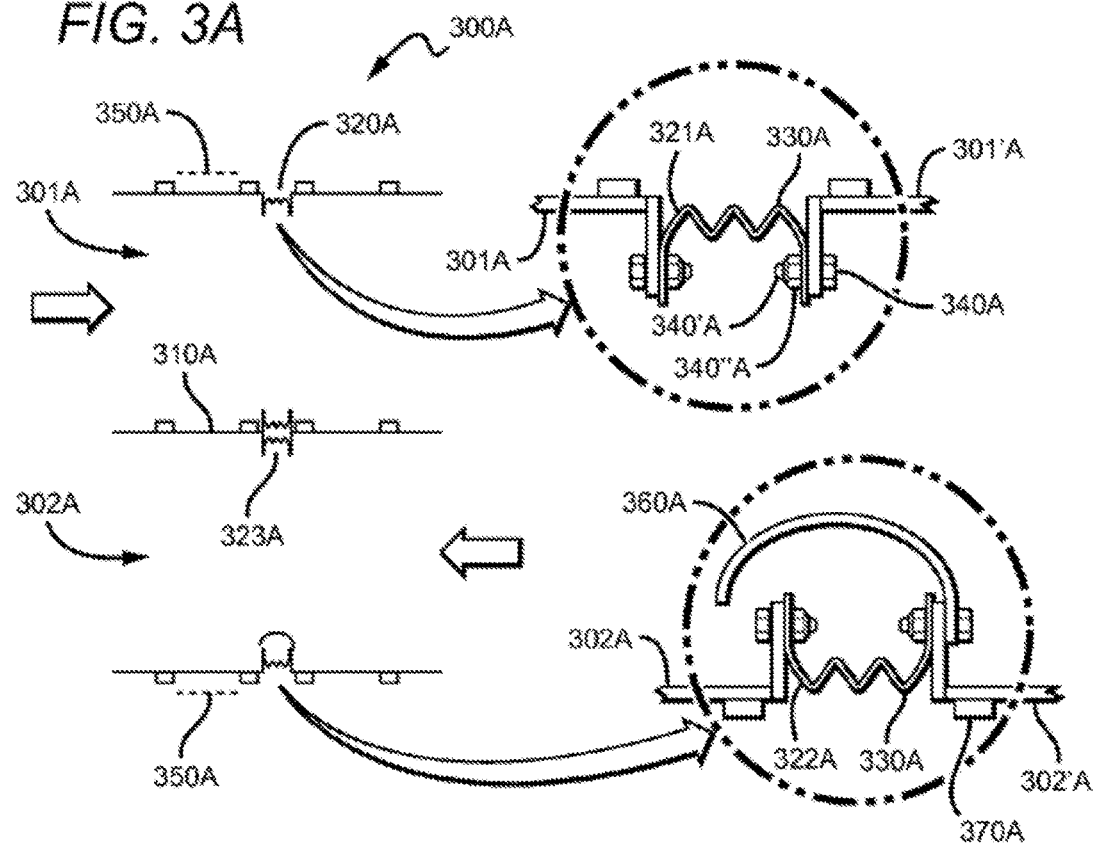
FIG. 3A is an exemplary schematic longitudinal cross section for a contiguous duct assembly and expansion joint according to the inventive subject matter.

One exemplary example of a contiguous duct assembly with an expansion joint is shown in FIG. 3A schematically depicting a vertical cross section along the longitudinal direction of a duct assembly in which both ducts have a rectangular profile. Here, a contiguous duct assembly 300A has a first duct 301A and a second duct 302A, wherein first and second ducts are fluidly isolated from each other to allow isolated flow of a clean gas (upper arrow) and flow of a particle-laden flue gas. Both ducts share common wall element 310A along the longitudinal axis of the first and second ducts. Here, the bottom wall of the first duct 301A is shared with the top wall of the second duct 302A. The common wall element 310A incorporates stiffeners 350A or other common structure to make the wall rigid (only some is shown in FIG. 3A). Both ducts are preferably lined with thermally insulation material (not shown), but insulation is not required in the common wall 310A when the temperature in the first duct 301A and second duct 302A are close (e.g., within 10, more typically 20, and most typically 30° C. In this exemplary aspect, the expansion joint 320A is configured to flexibly couple first and second ducts 301A and 302A to third and fourth ducts 301'A and 302'A. The insets in FIG. 3A illustrate the upper and lower portions of the expansion joint in more detail. Here, it can be seen that first and third ducts (301A and 301'A) are coupled to each other via expansion fabric 330A, which is in turn coupled to the ducts via first and second frame portions (321A and 322A) that are coupled to the respective ends of the first and second ducts. In the example of FIG. 3A, coupling is achieved via the nut and bolt fasteners (340A, 340'A, and backer bar 340"A). The second duct joint portion may include a dust shield 360A. Also shown is exemplary stiffener element 370A that provides additional rigidity to the walls of first duct 301A and a second duct 302A, third and fourth ducts 301'A and 302'A, and so on. Connector element 323A is coupled to the common wall element 310A and configured to form part of the expansion joint.

Figure 3B:
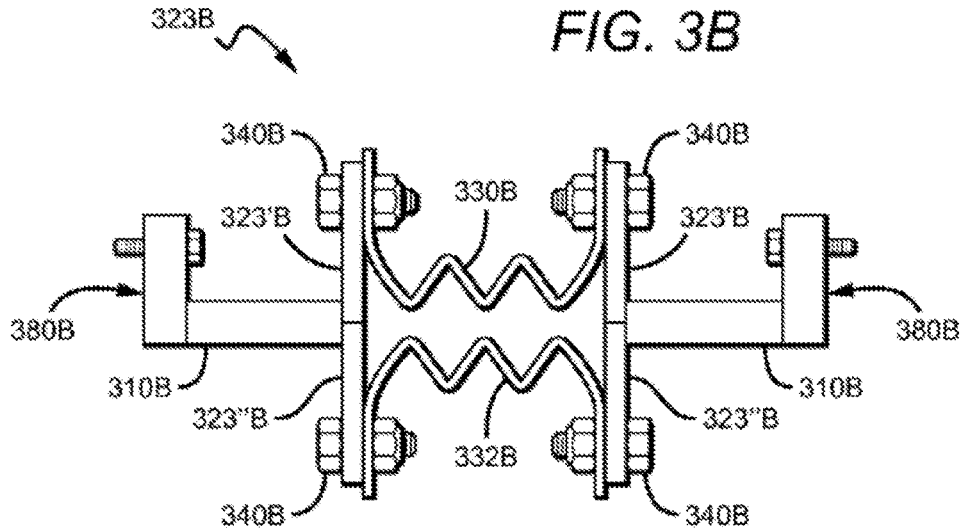
FIG. 3B is a detail view of two connector elements that are coupled to each other via an expansion fabric.
Figure 5A:
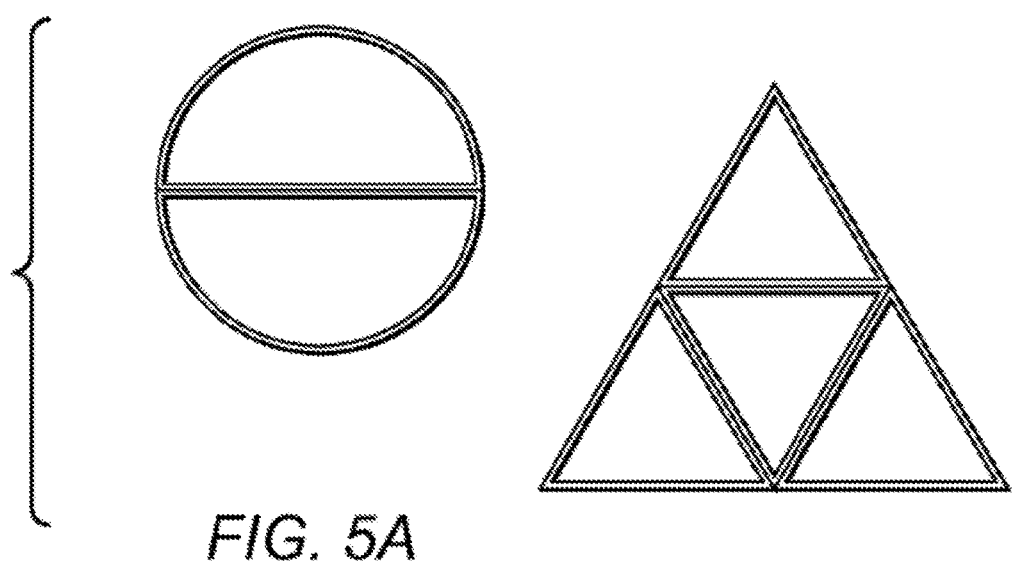
FIG. 5A depicts exemplary cross sectional shapes for contiguous duct assemblies according to the inventive subject matter.
Figure 5B:
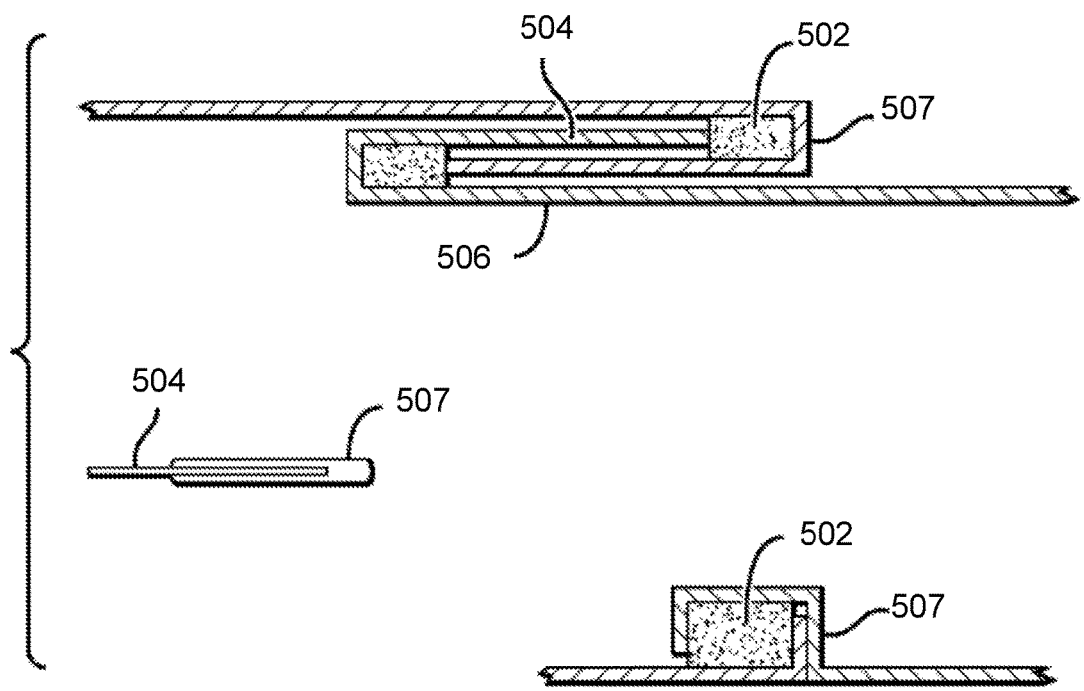
FIG. 5B shows an exemplary slide plate and exemplary pliable seals for use in the contiguous duct assemblies.

FIG. 3B shows the connector element 323B in more detail. Here, one portion (323'B) of the connector element extends into the inner volume of the first duct (301A, not shown, see FIG. 3A), and another portion (323"B) of the connector element extends into an inner volume of the second duct (302A, not shown, see FIG. 3A). It should be noted that the connector element may be formed from protruding ends 323'B and 323"B that are coupled (typically welded) to the common wall element 310B. Alternatively, the connector element may also be formed from a common wall portion 310B and a secondary connector element 380B, which in turn is then preferably removably coupled to the common wall element of the ducts via a plurality of fasteners or permanently coupled by welding. Regardless of the nature of the connector element, it is generally preferred that first and a second expansion fabrics (332B/330B) are coupled to the respective portions of the connector element via a plurality of fasteners (preferably bolt and nut fasteners, 340B). As will be readily appreciated, the plurality of fasteners is typically disposed in the inner volumes of the first and second ducts, respectively, to thereby allow for installation of the entire expansion joint from the inside of the ducts. Alternatively, a slide plate and a mating receiving structure may be used in place or in addition to the expansion fabric (e.g., slide plate 504 and a mating channel 506, 507 as shown in FIG. 5B). Furthermore and as already noted before, it is generally preferred that the common wall element (and other wall elements) is not required to be thermally insulated while the rest of the duct is preferably insulated using suitable insulation material. (350A, FIG. 3A).

Depending on the particular configuration and operational parameters, it should be noted that the at least a portion of the first and/or the second frame portions will form the connector element. For example, first and second frame portions may be configured as internal flanges wherein two sides of the flanges abut against each other and so form the connector element. Alternatively, the connector element may be an independent element that extends beyond the inner diameter of the ducts and cooperates with one or more external flanges on the outside of the ducts. Regardless of the particular manner of constructions, it is typically preferred that the first and/or the second frame portion, and/or the connector portion are removably coupled to the first and second ducts to facilitate installation, maintenance, and/or removal.

Thus, and viewed from another perspective, an internally bolted expansion joint for a contiguous duct assembly with fluidly isolated ducts and a common wall element as noted above will preferably have a connector element that is coupled to the common wall element and that is configured to form part of the expansion joint. In particularly preferred aspects, one portion of the connector element extends into an inner volume of the first duct while another portion of the connector element extends into an inner volume of the second duct. As before, it is generally preferred that a first and a second expansion fabric is coupled to the extending portions via a plurality of fasteners, wherein the fasteners are disposed in the inner volumes of the first and second ducts, respectively. In most typical examples, two distinct expansion fabrics will be coupled to the connector element to thereby allow formation of two distinct sealing elements that circumferentially enclose the respective ducts. However, in at least some circumstances, only a single expansion fabric may extend along the connecting element.

As noted above, the connector element may be welded to the common wall element, or may be removably coupled to the common wall element, for example, via a secondary connector element 380B and secondary fasteners, which are most preferably removable from and disposed within the inner volume of the first or second duct. Likewise, a dust shield and/or slide element may be included (e.g., coupled to the common wall element, the connector element, the first duct, and/or the second duct) in a manner as set forth above, and be coupled to the common wall element, the connector element, the first duct or the second duct. Of course, it should be appreciated that contemplated contiguous duct assemblies will be coupled to one or more other continuous duct assemblies (typically via the expansion fabric) to so form an elongated contiguous duct assembly. Other common elements of expansion joints such as insulation pillows may also be included.

Figure 4:
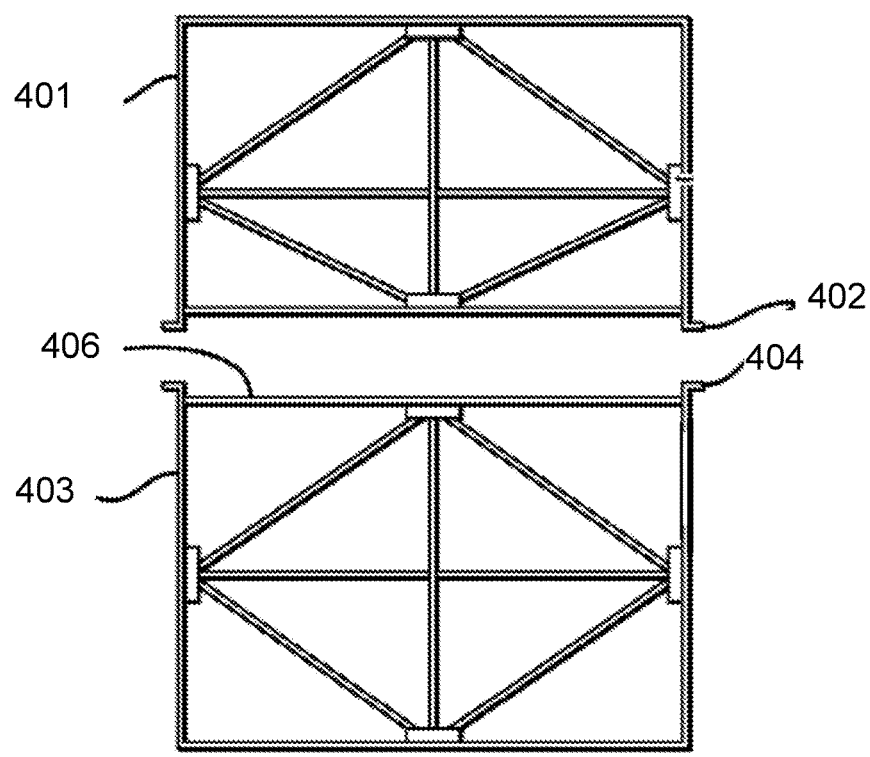
FIG. 4 is an exemplary schematic of a pre-assembled contiguous duct according to the inventive subject matter.

With respect to installation of large contiguous duct assemblies, the inventors contemplate a method of forming a contiguous duct assembly in which a first duct is provided that (typically, but not necessarily) lacks a permanent wall element along its longitudinal axis of the first duct 401, and that further has a first alignment flange 402. A second duct 403 is then provided that has a permanent wall element 406 along its longitudinal axis of the second duct 403, and that further has a second alignment flange 404. First and second ducts 401, 403 are then positioned relative to each other such that the permanent wall element 406 of the second duct forms a common wall element for the first and second ducts 401, 403 along the longitudinal axis of the first and second ducts 401, 403. As noted before, especially preferred contiguous duct assemblies will also include a connector element that is coupled to the common wall element 406 and that forms part of an expansion joint (as before, one portion of the connector element extends into the inner volume of the first duct and another portion of the connector element extends into the inner volume of the second duct). In a further installation step, first and second expansion fabrics are coupled from within the first and second ducts to the extending portions of the connector element via a plurality of fasteners, and in a further step, first and second alignment flanges 402, 404 are coupled to each other from the outside of the first and second ducts 401, 403 to so form the contiguous duct assembly. A typical exemplary pre-assembled contiguous duct assembly is shown in FIG. 4.

It should be especially noted that such contiguous duct assemblies are especially suitable for shipping of preassembled ducts. Most typically, the first duct 401 has a supplemental stiffener in place of the permanent wall to help maintain structural soundness. In addition, it is generally preferred that the first and second duct 401, 403 and the common wall element 406 are thermally insulated prior to finishing the installation. Furthermore, and while not limiting to the inventive subject matter, it is generally preferred that the first and second alignment flanges 402, 404 are removably coupled to each other. For extension of duct runs, it is contemplated that multiple contiguous duct assemblies can be coupled to each other in a manner as already explained above.

With respect to the size and material of the ducts in the contiguous duct assembly it is generally contemplated that all sizes and materials are deemed appropriate for use herein. However, it is especially preferred that the individual ducts have a square or rectangular cross section, and exemplary cross sections (e.g., half circle cross section, triangular cross section, etc.) and assemblies are schematically illustrated in FIG. 5A. Moreover, while all diameters are generally suitable, particularly preferred ducts will typically have a smallest internal dimension (e.g., width or height) of at least 1 meter, more typically at least 2 meter, and most typically at least 3 meter. Viewed from another perspective, the ducts are preferably sized such that a person can kneel, and more typically stand upright in the inner diameter of a duct. Therefore, additional structural features (e.g., stiffeners, corrugations, honeycomb layers, etc.) may form part of the wall elements of the ducts, or may be found outside the duct in a scaffold upon which the duct is fabricated. Therefore, especially preferred materials include metals and metal alloys, which are particularly suitable for air or gases at elevated temperatures (e.g., at least 100° C., more typically at least 200° C., and commonly at least 400° C.). In some cases of saturated gases, fiberglass reinforced plastic materials may be used or linings may be applied.

With respect to the common wall element it is generally preferred that the common wall element extends along the majority of the duct, and most typically is an entire wall of the duct (in most cases extending along the longitudinal axis). Thus, particularly preferred common wall elements will form the bottom of a first duct and the ceiling of another duct to so allow for maximum material and weight reduction. Of course, and where necessary, reinforcing elements may be included to improve or maintain structural integrity. Most typically, the common wall element will have internal supports, and it is therefore preferred that insulation material is provided to the entire duct to so avoid difficulties with differential expansion.

Most typically, contemplated contiguous duct assemblies and expansion joints will be useful in the routing of various high-volume gas streams, and especially air or flue gases. Therefore, the duct assemblies are especially contemplated in power plants, steel mills, pulp and paper processing plants, calcinations facilities, etc. Moreover, contemplated contiguous duct assemblies and expansion joints are particularly advantageous where multiple duct assemblies are coupled together to form long runs and long spans (e.g., at least 30 meter, more typically at least 50 meter, most typically at least 100 meter).

In further contemplated aspects of the inventive subject matter, it is generally preferred that the expansion fabric is made from a fabric, a natural or synthetic polymer, a metal, a refractory material, and all reasonable combinations thereof. Moreover, it is generally preferred that the expansion material is relatively flexible, that is, will deform without loss of functional integrity under operating conditions. Alternatively, one or more slide elements (e.g., fabricated from Teflon™; DuPont such as channel slide plate 504 and channel 506 and/or channel 507) or pliable sealing materials 502 that cooperate with mating receiving structures could replace one or more fabric elements as is exemplarily shown in FIG. 5B.

It should also be recognized that suitable connector elements may considerably vary in their exact configurations and number. However, it should be recognized that preferred connector elements will allow installation, retention, and removal of the extension fabric (or slide plate or pliable sealing material) from the inside of a duct. Viewed from another perspective, it should be appreciated that the connector element is preferably configured such that all connections are disposed within the inner diameter of the ducts. Therefore, suitable connector elements may be configured as internal flanges. Alternatively, a pair of frames may be configured to allow installation and coupling of one side of the frame to the ends of the duct (typically from within the duct), while the remaining sides of the frames are coupled together via an expansion fabric (again, typically from within the duct). Thus, the expansion joint may be delivered to a job site in a preassembled manner, or may require assembly at the site.

Figure 6:
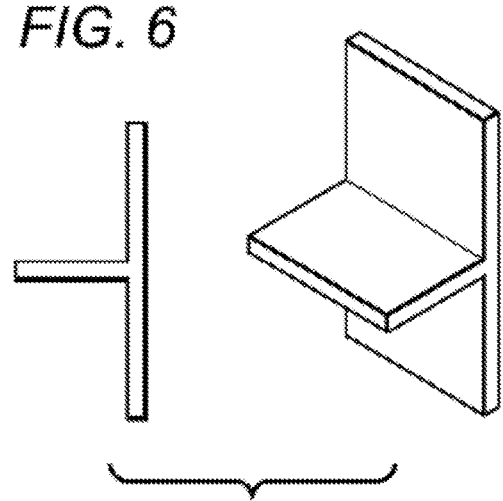
FIG. 6 is an exemplary "T" joint for use in the contiguous duct assemblies.
Figure 7:
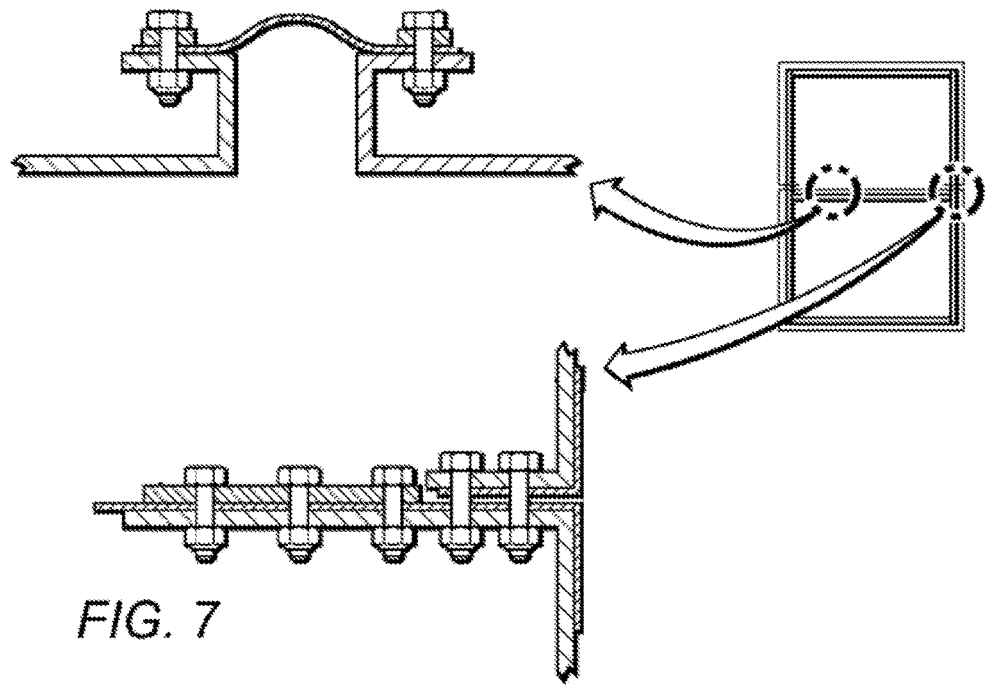
FIG. 7 is a second exemplary schematic longitudinal cross section for a contiguous duct assembly and expansion joint according to the inventive subject matter.
Figure 8:
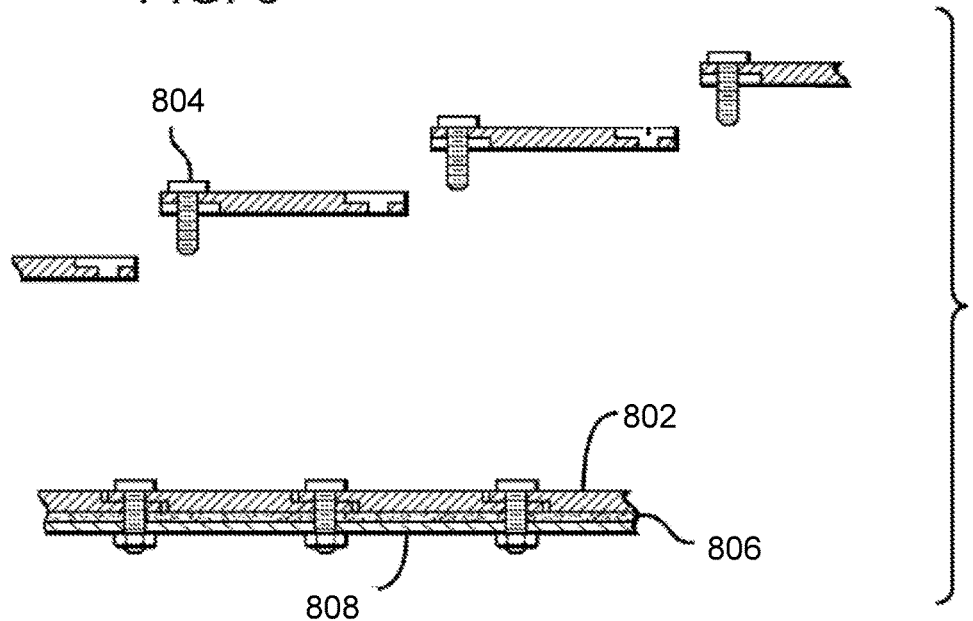
FIG. 8 is an exemplary schematic of a segmented backing plate for a contiguous duct assembly to ease assembly.

FIG. 6 shows a "T" joint that would be used in another example of a contiguous duct assembly with an expansion joint as shown in FIG. 7, which schematically depicts a cross section of a duct assembly in which both ducts have a rectangular profile. At the ends of all three ends of the "T", a splice is made to make a complete expansion joint. When the "T" is not used, as shown on FIG. 7, a continuous rectangular expansion joint is overlapped at a splice in the corners of the common wall elements. FIG. 8 shows an improved backing plate 802 design that is segmented (e.g., formed from segmented backing plates with lap joints for one sided bolting) and connected with welded bolts or studs through an expansion joint 806 and fluework flange 808 for one sided final fastening.

Regardless of the manner of construction, it should be appreciated that the internal bolted expansion joint will solve the problem of expensive transitions to use conventional externally bolted expansion joints. Of course, it should be noted that the internal bolt material may need to be upgraded to accommodate for the conditions in the ducts (e.g., corrosive and erosive). As also already noted before, it should be noted that the material of the expansion joint should be compatible with the design conditions, and especially the temperature.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A contiguous duct assembly, comprising:
  a first duct and a second duct, wherein first and second ducts are fluidly isolated from each other and coupled together such that the first and second ducts share a common wall element along a longitudinal axis of the first and second ducts;
  an expansion joint having a first and a second frame portion that are coupled to respective ends of the first and second ducts;
  a connector element that is coupled to the common wall element and that is configured to form part of the expansion joint, wherein one portion of the connector element extends into an inner volume of the first duct and wherein another portion of the connector element extends into an inner volume of the second duct;
  a first and a second expansion fabric coupled to the one portion and the other portion of the connector element via a plurality of fasteners, respectively; and
  wherein the plurality of fasteners are disposed in the inner volumes of the first and second ducts, respectively.

2. The contiguous duct assembly of claim 1 wherein the first and second ducts have a height or width that is at least two meter.

3. The contiguous duct assembly of claim 1 wherein at least a portion of the first and/or the second frame portions form the connector element.

4. The contiguous duct assembly of claim 1 wherein the first and the second frame portion and the connector portion are removably coupled to the first and second ducts.

5. The contiguous duct assembly of claim 1 wherein the fasteners are bolt and nut fasteners.

6. The contiguous duct assembly of claim 1 wherein at least one of the first and the second expansion fabric is replaced by a slide plate.

7. The contiguous duct assembly of claim 1 further comprising a dust shield coupled to the expansion joint or the first or second duct.

8. An internally bolted expansion joint comprising:
  a connector element that is coupled to a common wall element and configured to form part of the expansion joint;
  wherein one portion of the connector element extends into an inner volume of a first duct of a contiguous duct assembly and wherein another portion of the connector element extends into an inner volume of a second duct of a contiguous duct assembly, wherein the first duct and the second duct are fluidly isolated from each other and are coupled together such that the first duct and the second duct share the common wall element;
  a first and a second expansion fabric coupled to the one portion and the other portion of the connector element via a plurality of fasteners, respectively; and
  a segmented backing bar to allow one sided fastening, and wherein the plurality of fasteners are disposed in the inner volumes of the first duct and the second duct, respectively.

9. The internally bolted expansion joint of claim 8 wherein the connector element is welded to the common wall element.

10. The internally bolted expansion joint of claim 8 wherein the connector element is removably coupled to the common wall element via a secondary connector element and a secondary fastener, and wherein the secondary fastener is removable from and disposed within the inner volume of the first or second duct.

11. The internally bolted expansion joint of claim 8 wherein the first and second ducts and the common wall element are thermally insulated.

12. The internally bolted expansion joint of claim 8 further comprising a dust shield coupled to the common wall element, the connector element, the first duct or the second duct.

13. The internally bolted expansion joint of claim 8 wherein the contiguous duct assembly is coupled to a further continuous duct assembly having a third duct and a fourth duct via the expansion fabric.

* * * * *

UNITED STATES PATENT AND TRADEMARK OFFICE
CERTIFICATE OF CORRECTION

| | |
|---|---|
| PATENT NO. | : 9,702,494 B2 |
| APPLICATION NO. | : 13/898343 |
| DATED | : July 11, 2017 |
| INVENTOR(S) | : Johnson et al. |

Page 1 of 1

It is certified that error appears in the above-identified patent and that said Letters Patent is hereby corrected as shown below:

In the Claims

Column 9, Line 42 Claim 2: "meter" should read "meters"

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*